United States Patent [19]
Kovach et al.

[11] Patent Number: 5,765,091
[45] Date of Patent: Jun. 9, 1998

[54] CONTAINER AND LINER COMBINATION HAVING INTERLOCKING FEATURE FOR STORING SHEET OF PHOTOSENSITIVE MATERIAL, LINER AND METHOD FOR LOADING SUCH SHEETS INTO A CONTAINER AND WITH SUCH A CONTAINER LINER COMBINATION

[75] Inventors: Melinda Kaye Kovach, Woodbury; Eric Julius Donaldson, Saint Paul, both of Minn.; Jon Edward Holmes, West Melbourne, Fla.

[73] Assignee: Imation Corp., Oakdale, Minn.

[21] Appl. No.: 676,860

[22] Filed: Jul. 3, 1996

[51] Int. Cl.$^6$ ....................................... G03G 15/00
[52] U.S. Cl. ........................... 399/393; 271/145; 355/75
[58] Field of Search ........................... 399/23, 377, 378, 399/393, 391, 405; 355/75; 271/145, 167, 168, 169

[56] References Cited

U.S. PATENT DOCUMENTS

| | | | |
|---|---|---|---|
| 1,326,334 | 12/1919 | Gaffney . | |
| 3,831,928 | 8/1974 | Davis | 271/35 |
| 3,934,150 | 1/1976 | Matsumoto et al. | 414/412 |
| 4,768,771 | 9/1988 | May | 271/121 |
| 4,809,313 | 2/1989 | Gandolfo | 378/182 |
| 4,809,908 | 3/1989 | Keefe . | |
| 4,860,042 | 8/1989 | Tajima et al. | 396/519 |
| 4,915,229 | 4/1990 | Yamada et al. | 206/455 |
| 4,993,698 | 2/1991 | Buelens et al. | 271/145 |
| 5,008,694 | 4/1991 | Tajima et al. | 396/518 |
| 5,055,869 | 10/1991 | DiPietro | 396/517 |
| 5,106,074 | 4/1992 | Nishigaki . | |
| 5,123,040 | 6/1992 | Fabian | 378/182 |
| 5,127,339 | 7/1992 | Hood . | |
| 5,139,148 | 8/1992 | Peeters et al. | 206/455 |
| 5,320,338 | 6/1994 | Shinohara | 271/164 |
| 5,443,251 | 8/1995 | Kan et al. | 271/16 |
| 5,477,310 | 12/1995 | Lamb, Jr. et al. | 355/72 |
| 5,485,991 | 1/1996 | Hirano et al. | 271/121 |

FOREIGN PATENT DOCUMENTS

WO 96/16352  5/1996  WIPO .

*Primary Examiner*—S. Lee
*Attorney, Agent, or Firm*—William D. Bauer

[57] ABSTRACT

A container and liner combination includes an interlock feature. Multiple sheets of photosensitive material are placed on the liner. The container has a base in which the liner is positioned. The base has a interlock feature and the liner has a mating interlock feature. The interlock feature prevents movement of the liner in the feed direction as well as in a direction opposite the feed direction.

16 Claims, 8 Drawing Sheets

CONTAINER AND LINER COMBINATION HAVING INTERLOCKING FEATURE FOR STORING SHEET OF PHOTOSENSITIVE MATERIAL, LINER AND METHOD FOR LOADING SUCH SHEETS INTO A CONTAINER AND WITH SUCH A CONTAINER LINER COMBINATION

FIELD OF THE INVENTION

This invention relates generally to a liner and container for use with photosensitive media. In particular, the present invention is directed to an imaging unit container in which photosensitive sheets are stored on a liner that has an interlocking feature with the container.

BACKGROUND OF THE INVENTION

Professional imaging systems, such as those employed for medical diagnostic (radiological) applications, having historically captured and recorded images on relatively large sized sheets of photosensitive material, using large volume wet development equipment. With the recent enactment and more rigid enforcement of environmental regulations that require safeguards against exposure to and proper disposal of chemicals used in image development equipment, image processing providers have begun the replacement of these cumbersome and expensive wet-development systems with dry silver processes. For example, in a typical dry silver imaging application for medical diagnostic applications, such as a sonogram or X-ray. the image of interest may be electro-optically captured on a 20.3 cm×25.4 cm (8"×10") sheet of dry silver photosensitive medium, so that the image size is large enough to be viewed and analyzed, is readily physically accommodated within the patient's file, and may be easily handled and stored by medical personnel without exposure to wet chemicals.

In the course of operation of a dry silver process-based imaging system, just as in the use of relatively small hand-held cameras, it is necessary to store the individual frames of the photosensitive media in a light-tight housing, while affording ready access to the frames as they are needed by the imaging equipment. In hand-held cameras, the film packaging is relatively compact, with the film being configured as either a continuous multi-frame roll housed in a light-tight cylindrical canister, or as individual sheets that may be housed in an auto-feed sealed cartridge that is disposable after all of the film sheets have been used. Unfortunately, due to their configuration and small size, neither of these hand-held camera film storage and feed approaches is capable of storing larger sheets of photosensitive material and interfacing such media with the sheet or web advance mechanisms employed by the larger, diagnostic imaging equipment.

Light-tight, single-use containers or packages for larger photosensitive materials used in, for example, medical diagnostic applications are generally known. As shown in U.S. Pat. No. 4,860,042, these light-tight containers can include a film bag or a tray covered by a lid.

In applications where a kick feed mechanism is used to deliver the top sheet to the imaging unit, there is the concern that the liner not be fed into the imaging unit. U.S. Pat. No. 4,993,698 discloses a film magazine which has a light-tight magazine for dispensing recording sheets one by one from a stack in which the sheets are separated from each other by intervening spacing foils. The spacing foils are held against removal from the magazine by means of ear portions that protrude laterally beyond the sides of the stack and are engaged by means of a fixed abutment wall and the magazine interior. However, such a configuration prevents movement of the spacing foils in only one direction. There are no provisions which provide for the restriction of movement of the spacing foils in the opposite direction.

SUMMARY OF THE PRESENT INVENTION

An embodiment of the present invention includes a container and liner combination for storing sheets of photosensitive material and enabling individual sheets to be transported from the container to an imaging unit in a feed direction. The container fits within an entry port of the imaging unit to provide a light-tight environment for the photosensitive material. The combination includes a liner upon which multiple sheets of photosensitive material may be placed. The container also has a base upon which the liner is positioned. The base has an interlock feature. The liner has a mating interlock feature. The mating interlock feature has a first edge and a second edge. The mating interlock feature is positioned over the interlock feature. The first edge is proximate the interlock feature wherein movement of the liner in the feed direction is resisted. The second edge is proximate the interlock feature wherein movement of the liner in a direction opposite the feed direction is restricted.

Another embodiment includes a method of loading sheets of photosensitive material into a container for use with an imaging unit. The container has a base having an interlock feature, the sheets are positioned on a liner, the liner has a mating interlock feature, and the sheets and liner are stored in a light-tight bag. The method includes placing the light-tight bag on the base of the container, wherein the container is insertable within the imaging unit. One end of the light-tight bag is clamped with a clamping member positioned and moveable relative to the base, wherein the clamping member is moveable between an open position in which clearance between the clamping member and the base allows for insertion of the bag into the container and a closed position in which the clamping member and the base create a light-tight clamp seal both while the bag is in the container and upon removal of the bag from the container. Then, the container is inserted into the imaging unit and the light-tight bag is removed from between the clamping member which leaves the sheets of photosensitive material resting on the liner which rests on the base of the container. The mating interlock feature is positioned over the interlock feature. The first edge is proximate the interlock feature, wherein movement of the liner in the feed direction is resisted. The second edge is proximate the interlock feature, wherein movement of the liner in a direction opposite the feed direction is restricted.

Another embodiment of the invention is a liner for use with a container. The container is for storing sheets of photosensitive material and enabling individual sheets to be transported from the container to an imaging unit in a feed direction, wherein the container fits within an entry port of the imaging unit to provide a light-tight environment for the photosensitive material. The container has a base with an interlock feature. The liner includes the liner member upon which multiple sheets of the photosensitive material may be placed. The liner is positioned on top of the base. The liner has a mating interlock feature. The mating interlock feature has a first edge and a second edge. The mating interlock feature is positioned over the interlock feature. The first edge is proximate the interlock feature wherein movement of the liner in the feed direction is resisted and the second edge is proximate the interlock feature wherein movement of the liner in a direction opposite the feed direction is restricted.

DETAILED DESCRIPTION OF THE PREFERRED EMBODIMENTS

Figure 1:
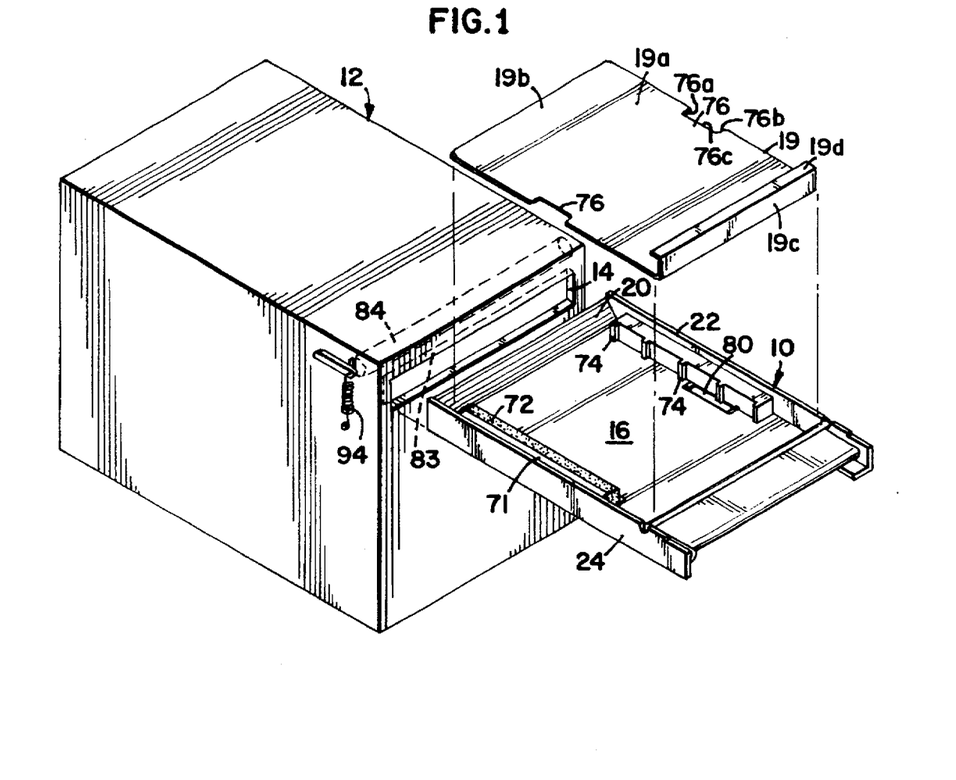
FIG. 1 is a perspective view of one embodiment of an imaging unit with an empty container and a liner shown in an exploded position.

The present invention is an interlocking feature for a liner and container for multiple sheets of photosensitive material to be fed to an imaging station of an imaging unit. The photosensitive material includes both photosensitive films and papers. One embodiment of the container is a carriage 10, a reusable component which mates with a feed station (not shown) of the imaging unit 12 by passing through an entry port 14 as shown in FIG. 1. The carriage 10 is shown being placed within the imaging unit 12 such that the carriage 10 is in a horizontal position even though it could be oriented differently within the imaging unit 12.

The carriage 10 includes a base 16 upon which the sheets of photosensitive material 18 can be placed. The carriage 10 can also include a front ramp 20 which extends upwardly and outwardly from one end to the base 16. Optionally, this carriage 10 includes side walls 22, 24 which extend substantially upward from the base 16.

Figure 3:
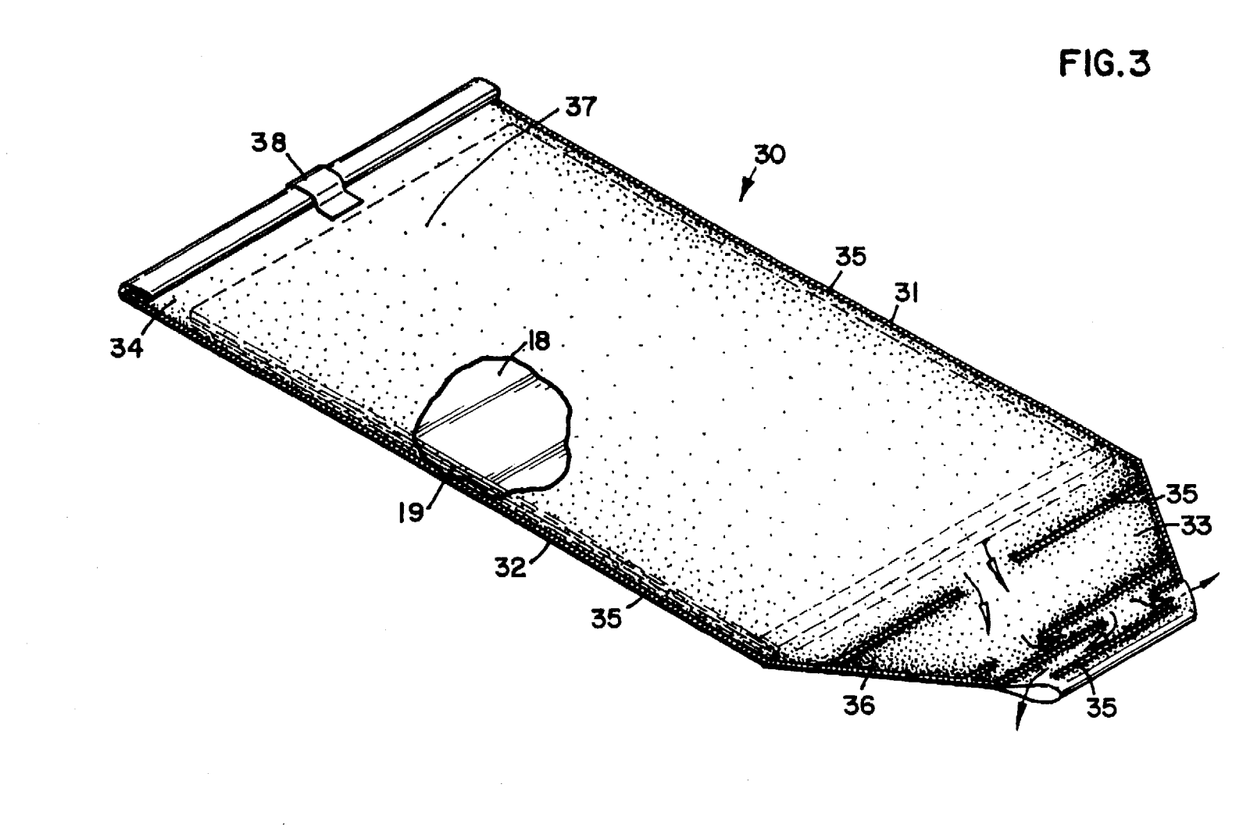
FIG. 3 is a perspective view of a light-tight package holding sheets of photosensitive material.

In FIG. 3, a light-tight enclosure for supplying the sheets of photosensitive film 18 and liner 19 is shown. The carriage 10 can be daylight loaded when used in conjunction with sheets 18, which are contained within a light-tight bag 30. As referenced in this application, the sheets of photosensitive material are designated 18, with the top sheet in the stack 18a and the bottom sheet 18b. The bag 30 can surround the liner 19 on which the film rests. The bag 30 has two sides 31,32, a back end 33, and a front end 34. The seals 35 may be made thermally if the bag 30 is a thermoplastic. Sealing the bag 30 inward from the back end 33 creates a bag tab 36. The tab 36 can have a chevron shape.

The front end 34 of the bag 30 is not sealed, but is rolled back and adhered to the middle section 37 of the bag 30 to maintain the light-tight enclosure of the sheets 18. The front end 34 can be adhered with a piece of perforated tape 38 which is broken by a user just prior to inserting the carriage 10 into the imaging unit 12. Although the tape 38 no longer holds the bag closed, the bag 30 remains folded in light-tight due to the set the film bag 30 has taken in the folded position.

Figure 2:
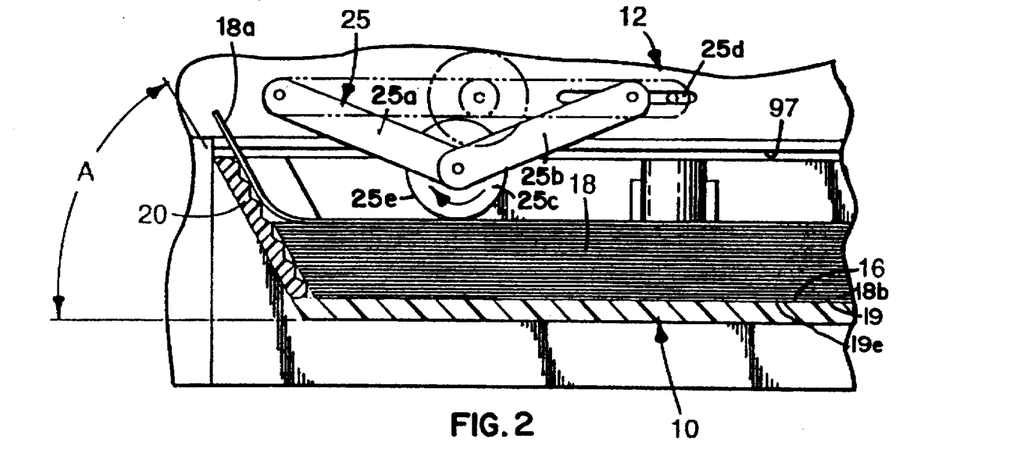
FIG. 2 is a cross-sectional side view of the container inserted within the imaging unit which includes a kick-feed mechanism.

One example of a kick feed mechanism 25 within the imaging unit 12 can frictionally slide the top sheet 18a from the carriage 10, as shown in FIG. 2, and feed it toward the imaging station. The front ramp 20 facilitates the sliding of the top sheet out of the container while being sufficiently vertical to hold the remaining sheets within the carriage 10. The angle A of the front ramp 20 need only be sufficient to guide the top sheet from the carriage 10 and into the imaging unit 12. For example, the angle A of between 30 and 85 degrees is sufficient, although other angles can suffice. More preferably, the angle A is approximately 60 degrees.

The kick feed mechanism 25 includes a linkage having members 25a and 25b upon which a drive roller 25c is rotatable mounted. The linkage 25b slides within a slot 25d in order to bring the drive roller 25c in contact with the top sheet of the sheets of photosensitive material 18, or the liner 19, as will be described more fully hereafter. The drive roller 25c has a outer drive surface 25e which is cylindrical. The controls to operate the kick feed mechanism 25 are well known in the art. The drive roller 25c is adapted to be driven in either direction. As shown in FIG. 2, it is rotating in the direction to feed the photosensitive material 18 into the imaging unit 12.

The liner 19 has a liner member 19a with a top surface 19b which is textured to increase the friction between the top surface 19b and the bottom sheet 18b of the photosensitive material. Operatively connected to the liner member 19a and extending generally upwardly is an end member 19c to which a top member 19d is connected. The liner has a bottom surface 19e which is positioned on the base 16 of the container 10. The liner is a photographically inert material such as ABS.

Figure 4:
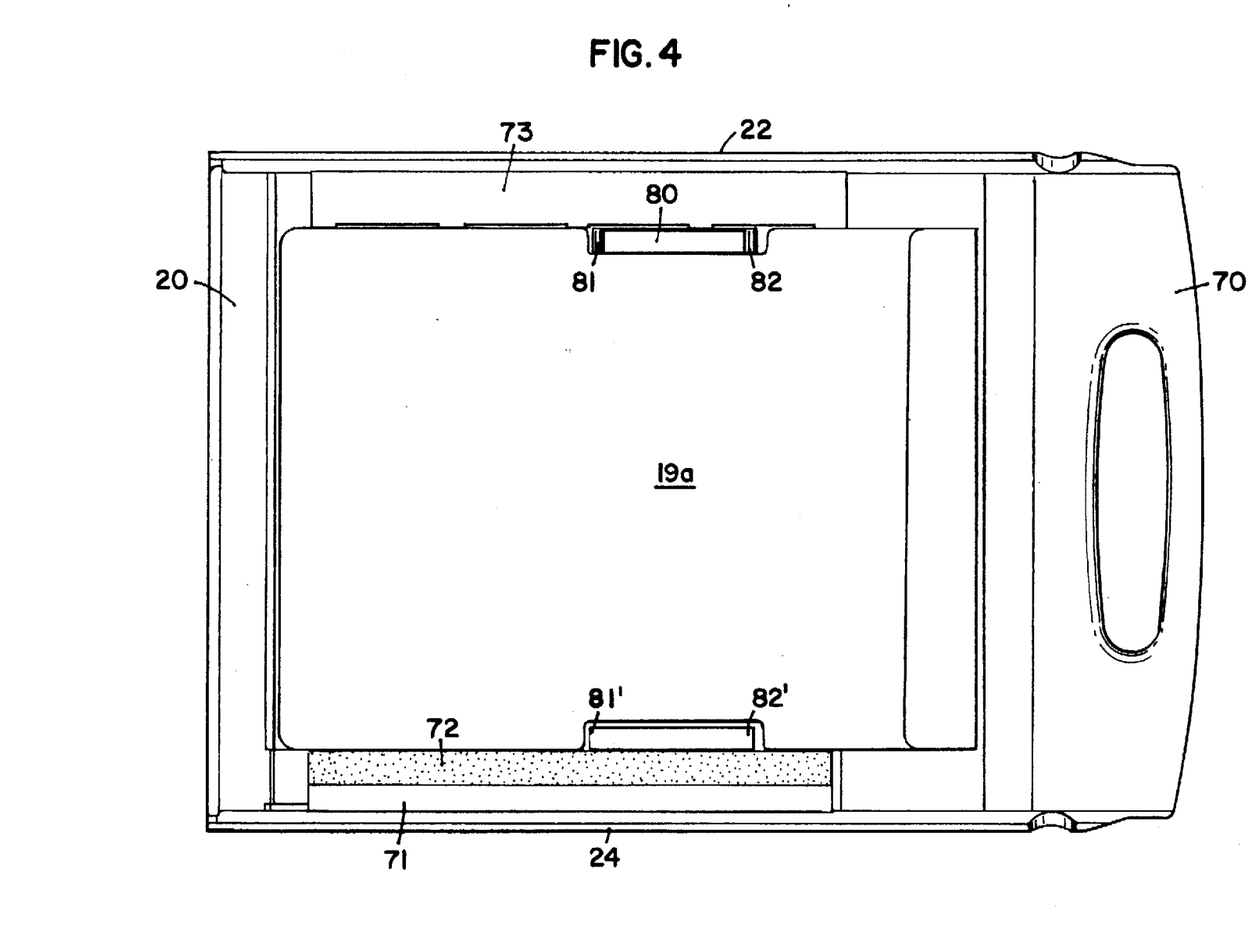
FIG. 4 is a top plan view of a container with a liner in position.

As will be described more fully hereafter, the liner 19 is sized generally to be placed on the base 16 of the container 10. The container 10 has a handle 70 at its back end. Positioned proximate the side 24 is a generally rectangular shaped block 71. Positioned next to the block 71 is a foam block 72. The foam block 72 fits in a slight depression in the base 16 to position the foam block. In addition, adhesive may be used between the foam block 72 and block 71. Proximate the other side 22, a generally rectangular block 73 is secured to the side 22. The block 73 has five locating protrusions 74. The distance between the locating protrusions 74 and the foam block 72 is slightly less than the width of the photosensitive sheets 18. The foam block 72 acts as a biasing member to push the sheets 18 against the locating protrusion 74, so as to register the sheets 18 in position.

The liner member 19a is sized approximately the same as the photosensitive sheet material 18. The liner member 19a is generally rectangular and has two notches 76 along its sides. The notches 76 have a front edge 76a, a back edge 76b, and a side 76c.

Figure 5:
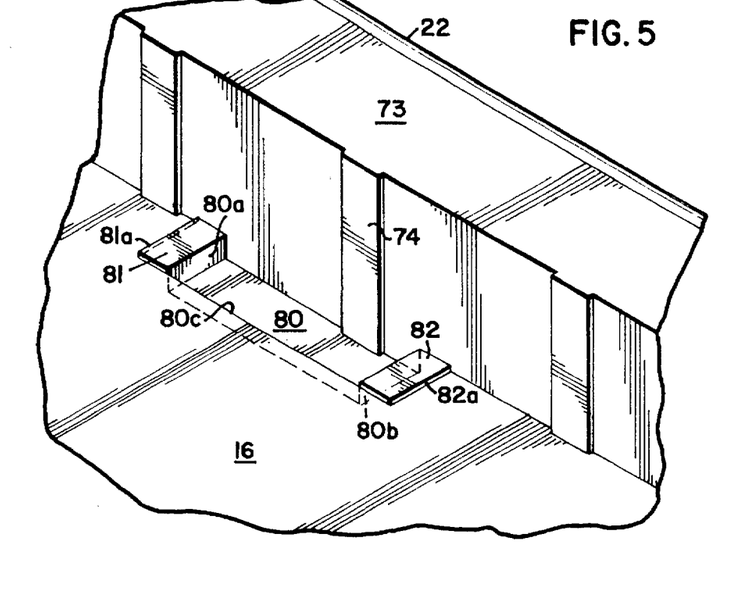
FIG. 5 is an enlarged perspective view of a portion of an empty container.

The base 16, under the liner member 19a, is generally planar. However, the base 16 has a depression 80. The depression 80 has a depth of approximately 0.21". The depression 80 has a side 80c, a front edge 80a, and rear edge 80b. Proximate the front edge 80a is a raised member 81. This raised area extends above the generally planar surface. Proximate the back edge 80b is an additional raised member 82. The raised areas 81 and 82 have a width generally the same as the width of the depression 80. The raised area 81 has a leading edge 81a. The raised area 82 has a trailing edge 82a. The distance from the trailing edge 82a to the leading edge 81a is approximately the distance the length of the notch 76 and is slightly less than the distance between 76a to 76b. The difference between the distance is approximately ⅛".

On the opposite side of the container, second raised areas 81' and 82' are positioned on the base 16. However, as previously noted, there is not a depression in the base 16 at this point. As will be more fully discussed hereafter, there is only one sensor which utilizes the depression 80 and therefore a similar depression is not needed between the raised surfaces 81' and 82'. Accordingly, on this side of the container, the raised areas 81' and 82' are a portion of a solid rectangular raised member. The ends of the solid rectangular member 81' and 82' function the same as the individually raised protrusions 81 and 82. Since there is no need to allow for a sensor to go between the raised portions on this side of the container, the raised portions 81' and 82' may be formed as a single member.

Figure 6:
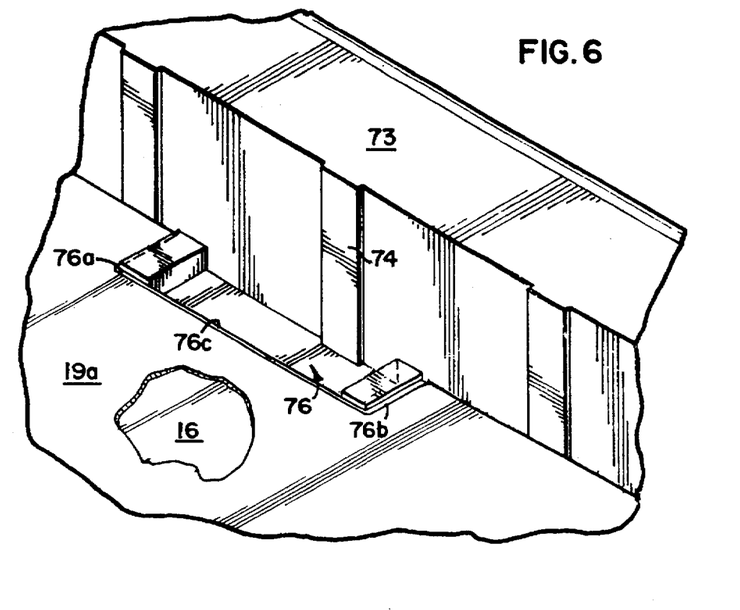
FIG. 6 is an enlarged perspective view of a container and liner.

The raised areas 81 and 82, in conjunction with the notch 76 form an interlock between the base 16 and the liner 19. As shown in FIG. 6, the notch 76 is positioned over the raised areas 81 and 82. The front edge 76a of the notch 76 is positioned proximate the leading edge 81a and the edge 76b of the notch 76 is proximate the trailing edge 82a. The height of the raised areas 81 and 82 is approximately equal to or less than the thickness of the liner 19, approximately 0.03 inches.

As shown in the drawings, there is an interlock feature shown on both sides of the container 10. However, it is understood that only one interlock feature may be utilized, although two are preferred.

Figures 7, 8:
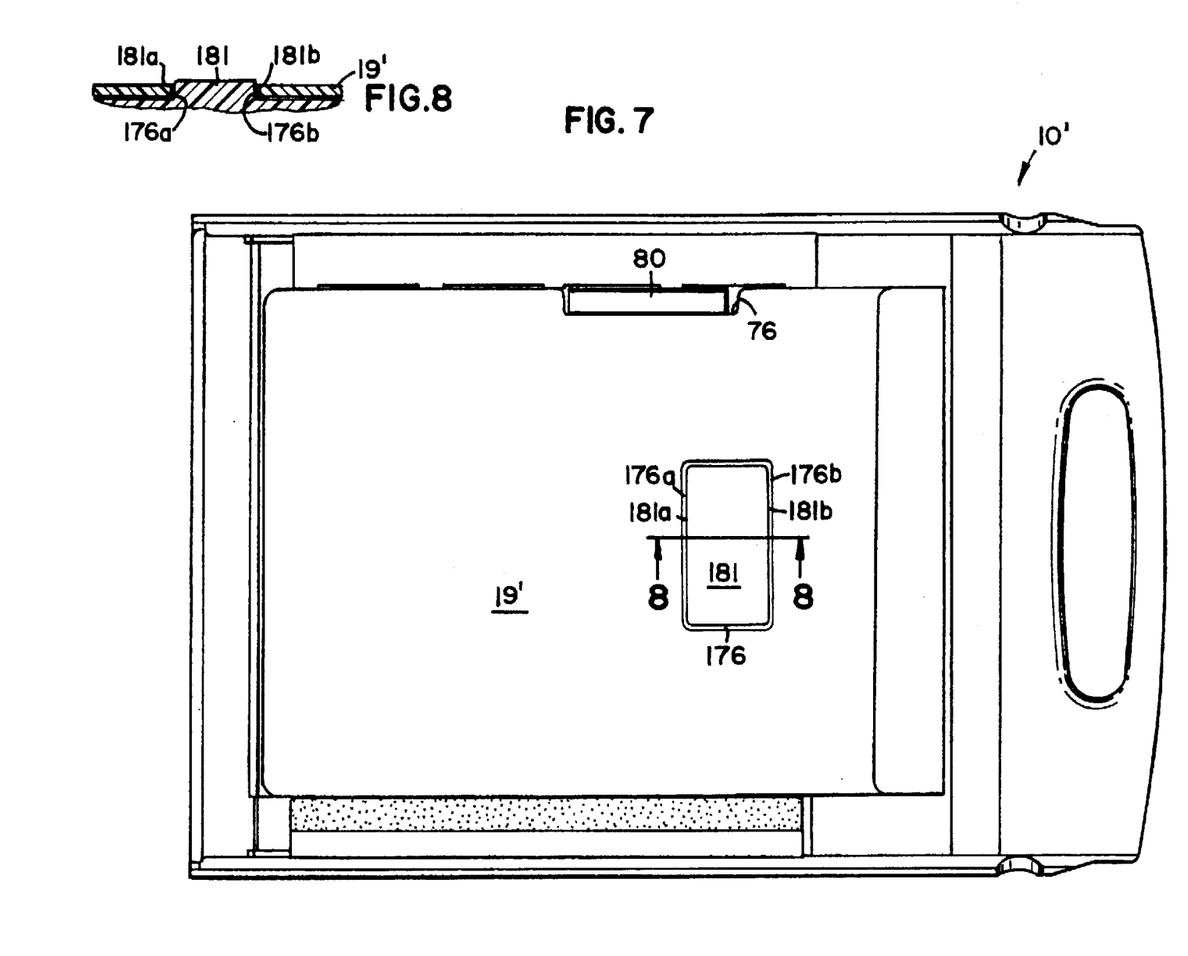
FIG. 7 is a top plan view of another container and liner.
FIG. 8 is a cross-sectional view of a portion of the container shown in FIG. 7 taken generally along the lines 8—8.

A second embodiment of the container and liner is shown in FIGS. 7 and 8. The container 10' as shown in FIGS. 7 and 8 is similar to the previously described container 10. However the interlock feature has been removed from the sides and placed in the center of the container 10. The container 10' includes a depression 80 over which the sensor, to be described hereinafter, is positioned. The raised areas 81 and 82 have been replaced by raised area 181. The raised area 181 is generally rectangular and, similar to the raised areas 81 and 82, is equal to or less than the thickness of the liner 19'. The raised area 181 is generally centered along the vertical axis extending through the center of the container 10' and positioned directly under the kick feed roller. The raised area 181 has a leading edge 181a and a trailing 181b. The liner 19' has a notch 76 for the purpose of providing access to the depression 80. In addition, the liner 19' has an opening 176. The opening is sized to fit over the raised member 181. The opening 176 has a leading edge 176a and a trailing edge 176b. The distance between 176a and 176b is slightly larger than the width of the raised area 181. The difference between the distance is approximately ⅛", similar to the difference in distance of the first embodiment discussed. The back wall of the tray is used to register the liner 19' in position over the raised surface 181. Other geometries and positions are also possible.

In addition to the interlock features shown, it is understood that other interlock features between the liner and the base may also be used. Examples of these would include a microreplicated surface of small patterns such as cones, grooves, serrated edges in either the liner or the base and a mating configuration in either the base or the liner.

To insert the bag 30 into the carriage 10, the carriage 10 is first removed from the imaging unit 12. Because the present invention allows the carriage 10 to be entirely removed from the imaging unit 12, a user can easily position the bag 30 within the carriage 10. The carriage 10 can clamp the back end 33 of the bag 30 through the clamping member 52 before being reinserted into the imaging unit 12. Once inserted, the carriage 10, mated with the feed station of the imaging unit 12, creates a light-tight environment for the bag 30. One embodiment of such a device is shown in co-pending U.S. patent application Ser. No. 08/344,462, filed Nov. 23, 1994, entitled "IMAGING UNIT CONTAINER HAVING SHIFTABLE WALLS", which is hereby incorporated by reference. Once the bag 30 is removed, when the carriage 10 is inside of the imaging unit 12, the liner 19 is positioned on top of the base 16.

Figure 9:
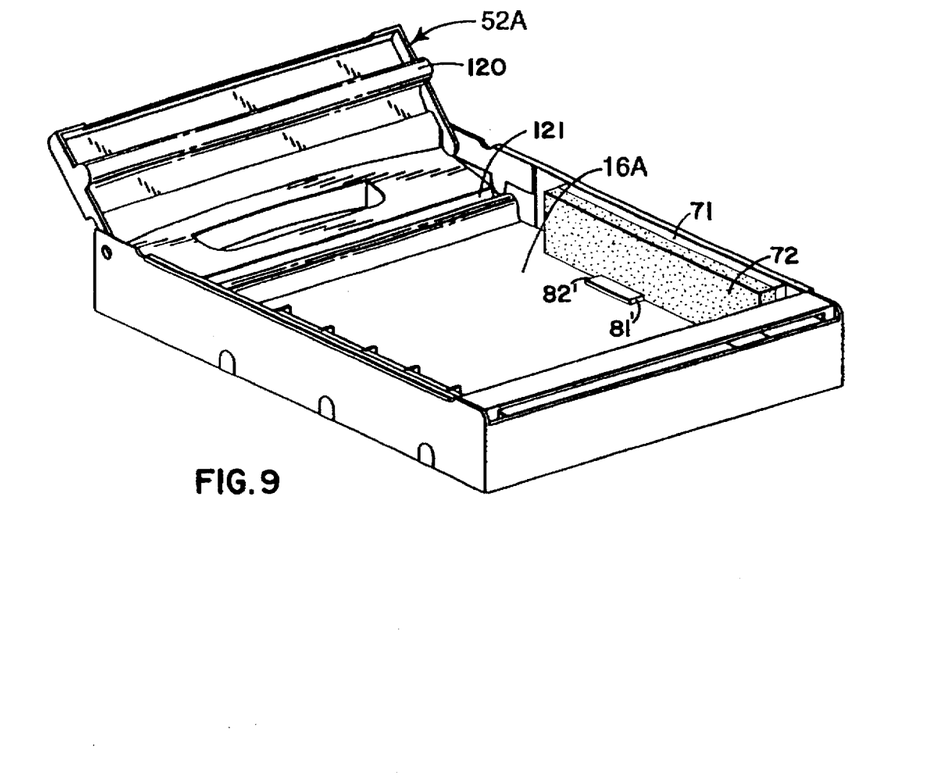
FIG. 9 is a perspective view of a container with a clamping member.
Figure 10:
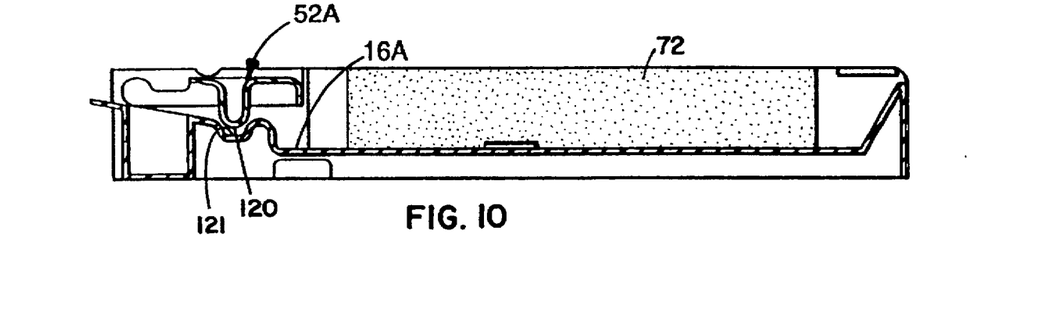
FIG. 10 is a cross-sectional view of the container in FIG. 9 with the clamping member in a closed position.

A first stationary surface 120 and a second stationary surface 121, as shown in FIGS. 9 and 10 provide for a clamping device 52 for the bag 30. The first and second stationary surfaces 120, 121, when brought together, can provide light-tightness due to the tortuous serpentine path, or some other shaped path. The stationary surfaces 120, 121, when brought together about the bag 30, can include a clearance which allows for removal of the bag 30 with minimal friction.

The first and second stationary surfaces 120, 121 are stationary. Preferably, the first stationary surface 120 is integral to the clamping member 52 and the second stationary surface is integral to the base 16. This can be accomplished, for example, by injection-molding the clamping member 52 having the first stationary surface 120, and the base 16 having the second stationary surface 121.

The first stationary surface 120 is shown as a single raised and rounded surface fitting within the second stationary surface 121, which is shown as a single groove or trough. Instead, the first stationary surface 120 could be made as a groove or trough and the second stationary surface 121 could be made as a raised surface. In addition, instead of a single pair of stationary surfaces 120, 121, multiple stationary surfaces (not shown) could be used.

The choice of materials for forming the stationary surfaces 120, 121 can be important to allow for minimal friction between the bag and the first and second stationary surfaces 120, 121 during removal. Acetal resins (e.g., Delrin®) and ABS have been shown to work, as have an acetyl resin impregnated with polyfluoroethylene (e.g., Delrin® with Teflon®).

Light-tightness where the carriage 10 meets the upper surface 83 of the entry port 14 can be provided by an upper roller 84 as also shown in FIG. 1. While the upper roller 84 could be attached to the carriage 10, the upper roller 84 is shown recessed within and extending across the upper surface 83 of the entry port 14 of the imaging unit 12. When the carriage 10 is inserted into the entry port 14, the upper roller 84 rolls over the top surface of the clamping member 52 of the carriage 10 forming the light-tight seal.

For further light-tightness where the carriage 10 meets the upper surface 83 of the entry port 14, the clamping member 52 can include an upper roller groove in which the upper roll 84 can fit. The position of the upper roller 84 in the upper roller groove creates the light-tight seal.

Light is also prevented from entering the imaging unit 12 along the side walls 22, 24 of the carriage 10. The side walls 22, 24 of the carriage 10 extend up to and mate with the upper roller 84 of the imaging unit 12.

To downwardly bias the upper roller 84 into the upper roller groove 88 after the roller 84 rolls over the top surface of the clamping member 52, a spring 94 can be attached to the imaging unit 12 as shown in FIG. 1.

In addition, when the upper roller 84 is held down within the upper roller groove, horizontal movement of the upper roller 84 relative to the carriage 10 is reduced. Because the upper roller 84 should not move horizontally relative to the imaging unit 12, the upper roller 84 prevents horizontal movement of the carriage 10 relative to the imaging unit 12 when the upper roller 84 is within the upper roller groove. Preventing horizontal movement of the carriage 10 is important for effective feeding of the sheets 18 into the imaging station of the imaging unit 12.

In place of the upper roller 84 for light-tightness at this location, a different upper light-tight member could be used. A compliant member (now shown), such as a strip of felt or a plurality of brushes, could maintain intimate contact and light-tightness between the clamping member 52 and the upper surface 83 of the entry port 14. Similarly, another light-tight member (not shown) having a living hinge which could bias a portion of the light-tight member into a mating groove (not shown) on the top surface of the clamping member 52 for light-tightness. Still another upper light-tight member (not shown) could be biased downwardly so that it would fit into a mating groove (not shown) in the carriage 10. The biasing could be accomplished by a living hinge connected to or a part of the light-tight member.

Figure 11:
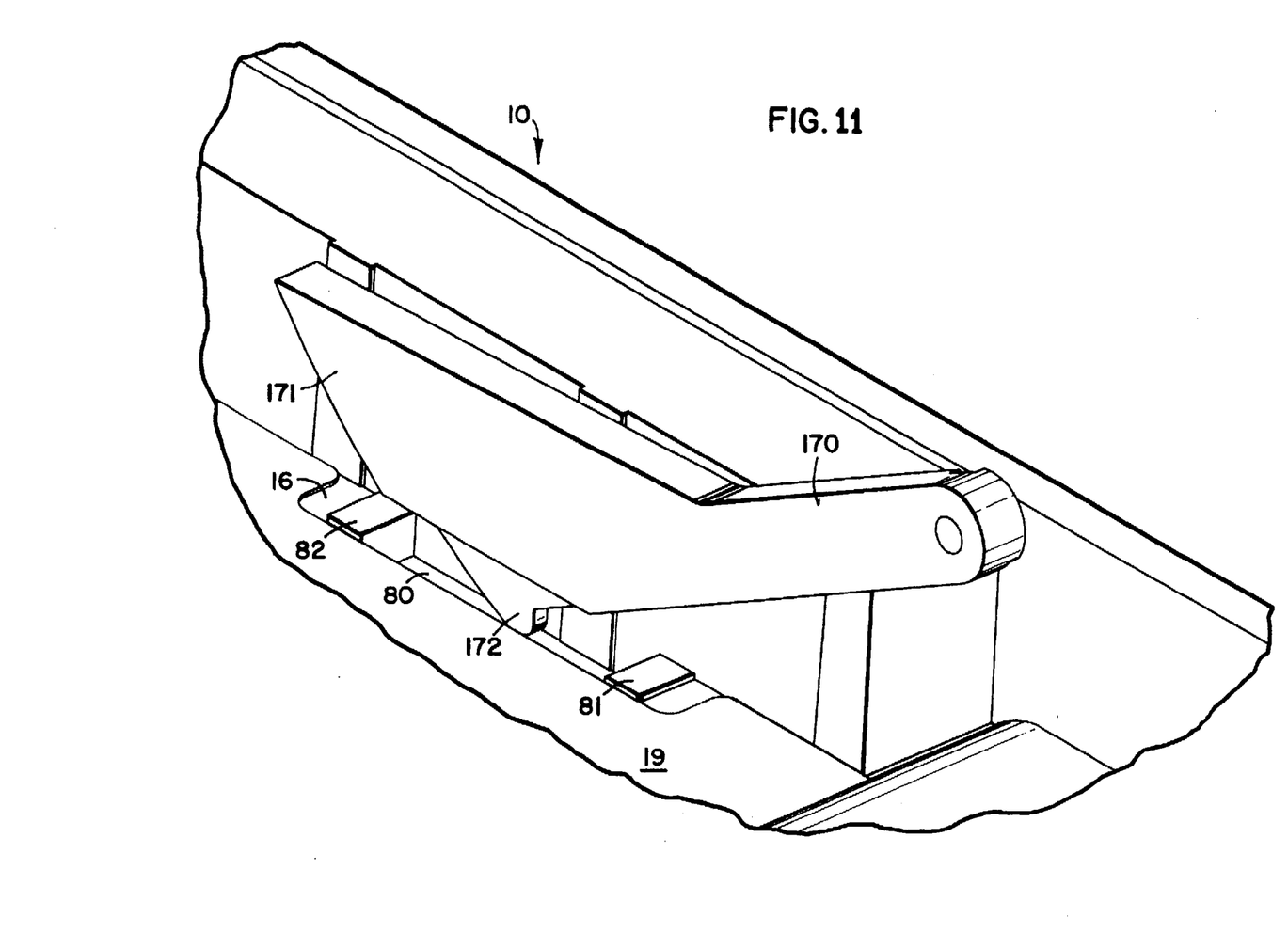
FIG. 11 is an enlarged perspective view of a portion of a container 10 showing the sensor installed.
Figure 12:
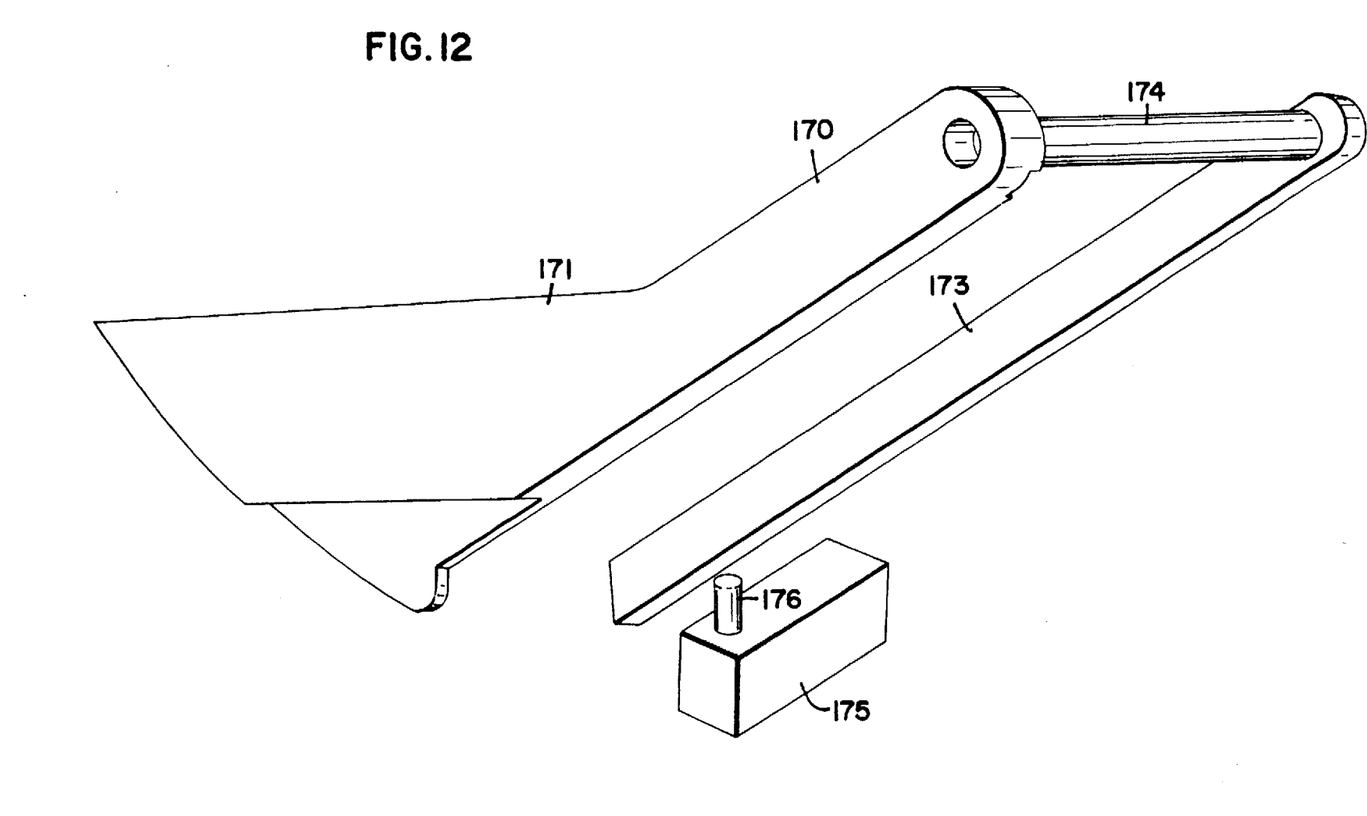
FIG. 12 is a perspective view of the sensor shown in FIG. 11 operatively connected to a switch.

A sensor is used to determine when the photosensitive materials 18 have all been dispensed. The sensor 170 was not shown in the previous figures for clarity sake. However, such sensors are generally well known in the art. The sensor in FIG. 11 includes a sensor flag 171. The sensor flag 171 has a bottom member 172. The bottom member 172 will generally rest on the top sheet 18a. Referring to FIG. 12, the sensor flag 170 is connected to an arm 173 by means of a press fit pin 174. The arm 173 is positioned outside of the area of the container 10. The arm 173 is approximately parallel to the flag sensor 170. The arm 173 is positioned above a mechanical switch 175 which has a switch 176 that may be depressed.

As shown in FIG. 12, there would be sheets of material 18 on top of the liner 19, thereby holding the sensor flag up. Then, as shown in FIG. 11, when the media 18 has been dispensed, the sensor flag 172 drops down into the depression 80. By doing so, the arm 173 is lowered and makes contact with the switch 176. Then, the switch 175 sends a signal to the imaging unit that the tray is out of photosensitive material 18. Shortly after this occurs, the kick feed roller 25 reverses to eject the tray.

After the bag 30 has been inserted into container 10 and then into the unit 12 and finally removed, the interlock feature of the present invention is utilized. The notch 76 is positioned over the protrusions 81 and 82 and/or 81' and 82'. The leading edge 81a is positioned proximate the front edge 76a and the trailing edge 82b is positioned proximate the edge 76b of notch 76. As previously discussed, there is a slight gap between the edges of the notch and raised areas. As the kick feed mechanism 25 is activated, the top sheet 18a is dispensed. As the number of sheets in the container 10 diminish, the force applied to the liner also increases. This increased force tends to urge the liner to be dispensed with the remaining sheets 18. However, the interlock feature prevents the dispensing of the liner 19. That is, the edge 76b comes in contact with edge 82a and movement of the liner is restricted. Similarly, when the sensor 170 indicates that the last sheet 18 has been fed, the kick feed mechanism 25 reverses to kick the container 10 out of the imaging unit 12. With this reverse rotation of the kick feed mechanism 25, the liner could also be dispensed out of the back of the container 10. However, the interlock feature prevents the liner 19 from movement in this opposite direction. That is, the edge 81a contacts the edge 76a and prevents movement of the liner 19.

Similarly, the edges 181a and 176a prevent movement of the liner 19' in the feed direction and the interaction between surfaces 181b and 176b prevent movement of the liner 19b in the opposite direction.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A container and liner combination for storing sheets of photosensitive material and enabling individual sheets to be transported from the container to an imaging unit in a feed direction, wherein the container fits within an entry port of the imaging unit to provide a light-tight environment for the photosensitive material, and comprises:

a liner upon which multiple sheets of photosensitive material may be placed;

a base upon which the liner is positioned, the base having an interlock feature; and the liner having a mating interlock feature, the mating interlock feature having an opening having a first edge and a second edge, the mating interlock feature positioned over the interlock feature, the first edge is proximate the interlock feature wherein movement of the liner in the feed direction is resisted and the second edge is proximate the interlock feature wherein movement of the liner in a direction opposite the feed direction is restricted.

2. The combination of claim 1, wherein the interlock feature is a first raised protrusion and the mating interlock feature is a first opening.

3. The combination of claim 2, wherein the first raised protrusion has a height approximately equal to or less than the liner's height.

4. The combination of claim 2, further comprising a second raised protrusion and the first opening is elongate and positioned at the liner's side and the first raised protrusion is proximate the first edge and the second raised protrusion is proximate the second edge.

5. The combination of claim 4, further comprising:

a second opening positioned at the liner's other side, the second opening having a first edge and a second edge; and the base having third and fourth protrusions, the first edge of the second opening is proximate the third protrusion and the second edge of the second opening is proximate the fourth protrusion.

6. The combination of claim 2, further comprising a sensor for signaling when all the photosensitive sheets have been used, the sensor positioned over the first opening.

7. The combination of claim 1, wherein the interlock feature and mating interlock feature generally extend in a direction normal to the feed direction.

8. The combination of claim 1, wherein the base interlock feature includes a raised area positioned proximate a centerline of the container and the liner having an opening positioned over the raised area.

9. The combination of claim 8, wherein the raised area is generally rectangular.

10. A method of loading sheets of photosensitive material into a container for use with an imaging unit in which the sheets of photosensitive material can be fed from the container to the imaging unit in a feed direction, the container having a base having an interlock feature, the sheets positioned on a liner, the liner having a mating interlock feature, the mating interlock feature having a first edge and a second edge, the sheets and liner stored in a light-tight bag, the method comprising:

placing the light-tight bag on the base of the container, wherein the container is insertable within the imaging unit;

clamping one end of the light-tight bag with a clamping member positioned and movable relative to the base, wherein the clamping member is movable between an open position in which clearance between the clamping member and the base allows for insertion of the bag into the container and a closed position in which the clamping member and the base creates a light-tight clamp seal both while the bag is in the container and upon removal of the bag from the container;

inserting the container into the imaging unit, and removing the light-tight bag from between the clamping member which leaves the sheets of photosensitive material resting on the liner which rests on the base of the container; and     positioning the mating interlock feature over the interlock feature, the first edge is proximate the interlock feature, wherein movement of the liner in the feed direction is resisted and the second edge is proximate the interlock feature, wherein movement of the liner in a direction opposite the feed direction is restricted.

11. A liner for use with a container, the container for storing sheets of photosensitive material and enabling individual sheets to be transported from the container to an imaging unit in a feed direction, wherein the container fits within an entry port of the imaging unit to provide a light-tight environment for the photosensitive material, the container having a base, the base having an interlock feature, the liner comprises:

a liner member upon which multiple sheets of photosensitive material may be placed, the liner positioned on top of the base; and     the liner having a mating interlock feature, the mating interlock feature having a first edge and a second edge, the mating interlock feature positioned over the interlock feature, the first edge is proximate the interlock feature wherein movement of the liner in the feed direction is resisted and the second edge is proximate the interlock feature wherein movement of the liner in a direction opposite the feed direction is restricted.

12. The liner of claim 11, wherein the interlock feature of the container is a first raised protrusion and the mating interlock feature is a first opening.

13. The liner of claim 12, wherein the first raised protrusion has a height approximately equal to or less than the liner's height.

14. The liner of claim 12, wherein the base of the container has a second raised protrusion and further comprising the first opening is elongate and positioned at the liner's side and the first raised protrusion is proximate the first edge and the second raised protrusion is proximate the second edge.

15. The liner of claim 14, wherein the base has third and fourth protrusions and further comprising:

a second opening positioned at the liner's other side, the second opening having a first edge and a second edge; and     the first edge of the second opening is proximate the third protrusion and the second edge of the second opening is proximate the fourth protrusion.

16. The liner of claim 12, further comprising a sensor for signaling when all the photosensitive sheets have been used, the sensor positioned over the first opening.

\* \* \* \* \*